US012123596B2

(12) United States Patent
Rangrej et al.

(10) Patent No.: US 12,123,596 B2
(45) Date of Patent: Oct. 22, 2024

(54) MIXER VANES

(71) Applicant: General Electric Company, Schenectady, NY (US)

(72) Inventors: Rimple Rangrej, Bengaluru (IN); Saket Singh, Bengaluru (IN); Pradeep Naik, Bengaluru (IN); Neeraj Mishra, Bengaluru (IN)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 17/389,022

(22) Filed: Jul. 29, 2021

(65) Prior Publication Data

US 2023/0034004 A1 Feb. 2, 2023

(51) Int. Cl.
*F23R 3/14* (2006.01)

(52) U.S. Cl.
CPC .......... *F23R 3/14* (2013.01); *F05D 2240/127* (2013.01); *F05D 2240/35* (2013.01); *F05D 2250/183* (2013.01)

(58) Field of Classification Search
CPC .......................................................... F23R 3/14
See application file for complete search history.

(56) References Cited

U.S. PATENT DOCUMENTS

| | | | |
|---|---|---|---|
| 3,048,014 | A | 8/1962 | Schmidt |
| 3,979,069 | A | 9/1976 | Garofalo |
| 4,566,280 | A | 1/1986 | Burr |
| 5,392,752 | A | 2/1995 | Brogan et al. |
| 7,266,945 | B2 | 9/2007 | Sanders |
| 9,279,587 | B2 | 3/2016 | Clemen et al. |
| 9,347,663 | B2 | 5/2016 | Poyyapakkam et al. |
| 9,435,537 | B2 | 9/2016 | ELKady et al. |
| 9,845,956 | B2 | 12/2017 | Ziminsky et al. |
| 9,890,690 | B2 | 2/2018 | Chiera et al. |
| 2007/0028618 | A1 | 2/2007 | Hsiao et al. |
| 2007/0028624 | A1 | 2/2007 | Hsieh et al. |
| 2013/0255261 | A1 | 10/2013 | Abdelnabi et al. |
| 2016/0061452 | A1 | 3/2016 | Walker et al. |
| 2017/0089584 | A1 | 3/2017 | Poyyapakkam et al. |
| 2017/0137116 | A1 | 5/2017 | Ireland et al. |
| 2018/0156463 | A1 | 6/2018 | Dai et al. |

(Continued)

FOREIGN PATENT DOCUMENTS

| | | | |
|---|---|---|---|
| CN | 101986034 | A | 3/2011 |
| CN | 203052721 | U | 7/2013 |
| CN | 204693494 | U | 10/2015 |

(Continued)

*Primary Examiner* — Katheryn A Malatek
(74) *Attorney, Agent, or Firm* — Venable LLP; Griffin A. A. Deadwick; Michele V. Frank

(57) ABSTRACT

A gas turbine combustor includes a main mixer for providing an air flow to mix with a fuel flow in a combustor. The main mixer includes an annular mixer body, a plurality of mixer vanes located circumferentially around the annular mixer body, and a plurality of wedges extending radially outward from each of the plurality of mixer vanes. At least one of the wedges includes serrations. The air flow through the main mixer enters the main mixer at a leading edge of the mixer vane, flows over the plurality of wedges, and exits the mixer vanes at a trailing edge of the main mixer. The wedges create vortices in the air flow to provide a uniform fuel-air flow.

20 Claims, 11 Drawing Sheets

(56) References Cited

U.S. PATENT DOCUMENTS

2020/0041129 A1* 2/2020 Pal ............................ F23R 3/14

FOREIGN PATENT DOCUMENTS

| | | | |
|---|---|---|---|
| CN | 105307931 | A | 2/2016 |
| CN | 206905031 | U | 1/2018 |
| EP | 0745809 | B1 | 11/2008 |
| JP | 2014098508 | A | 5/2014 |

* cited by examiner

MIXER VANES

TECHNICAL FIELD

The present disclosure relates to a main mixer for a combustor. More particularly, the present disclosure relates to mixer vanes of a main mixer for a combustor.

BACKGROUND

An engine, such as a gas turbine engine, may include a main mixer for providing an air flow to a combustion section of the engine. The air through the main mixer may mix with a fuel flow to generate a fuel-air mixture. The main mixer typically includes mixer vanes that assist in mixing the air and fuel to provide the fuel-air mixture.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims.

Moreover, it is to be understood that the following detailed description are exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

The mixer of the present disclosure provides mixer vanes having surface features, such as, wedges. The wedges may or may not include serrations or other profiles. The wedges and/or the wedges with profiles create vortices in the air flowing therethrough that may enhance air-fuel mixing, may provide a more uniform air-fuel mix to the combustor, may improve turbulent kinetic energy levels, and may reduce $NO_x$ emissions.

Figure 1A:
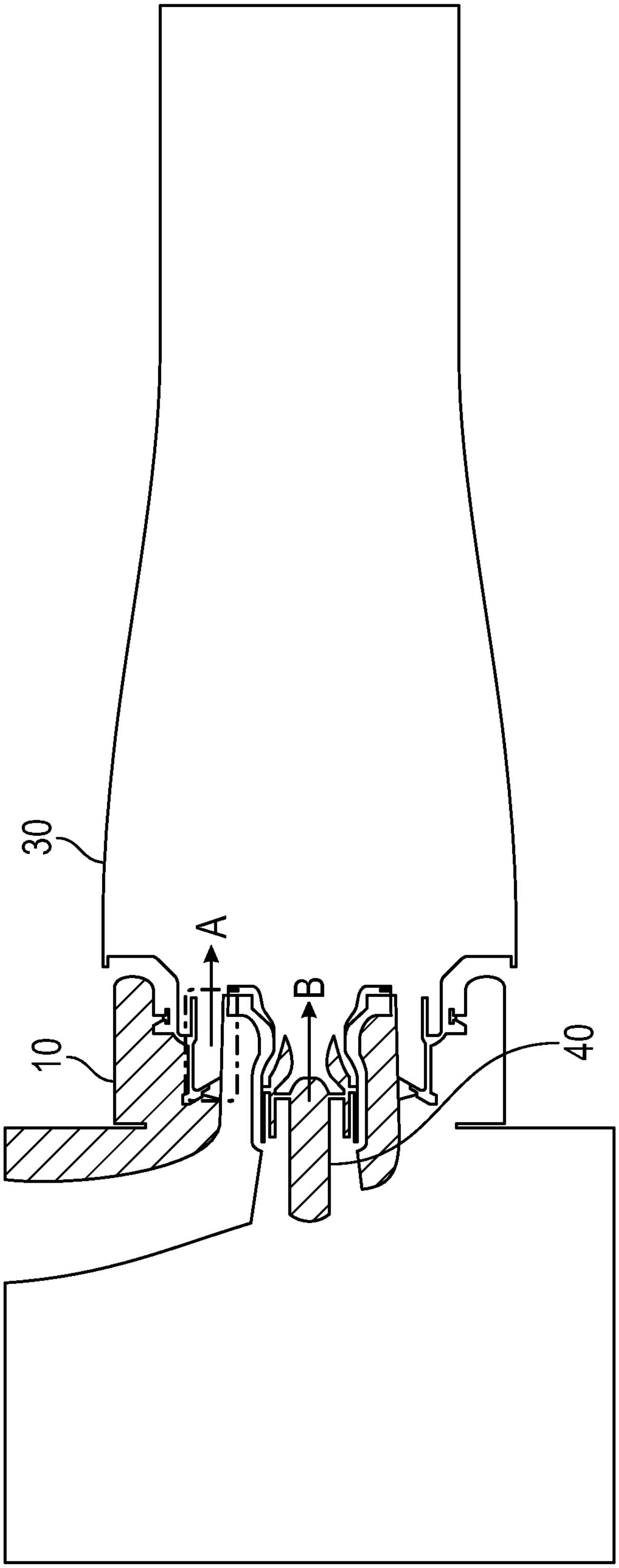
FIG. 1A shows a schematic cross-sectional view of a combustion section, taken along a centerline of the combustion section, according to an embodiment of the present disclosure.
Figure 1B:
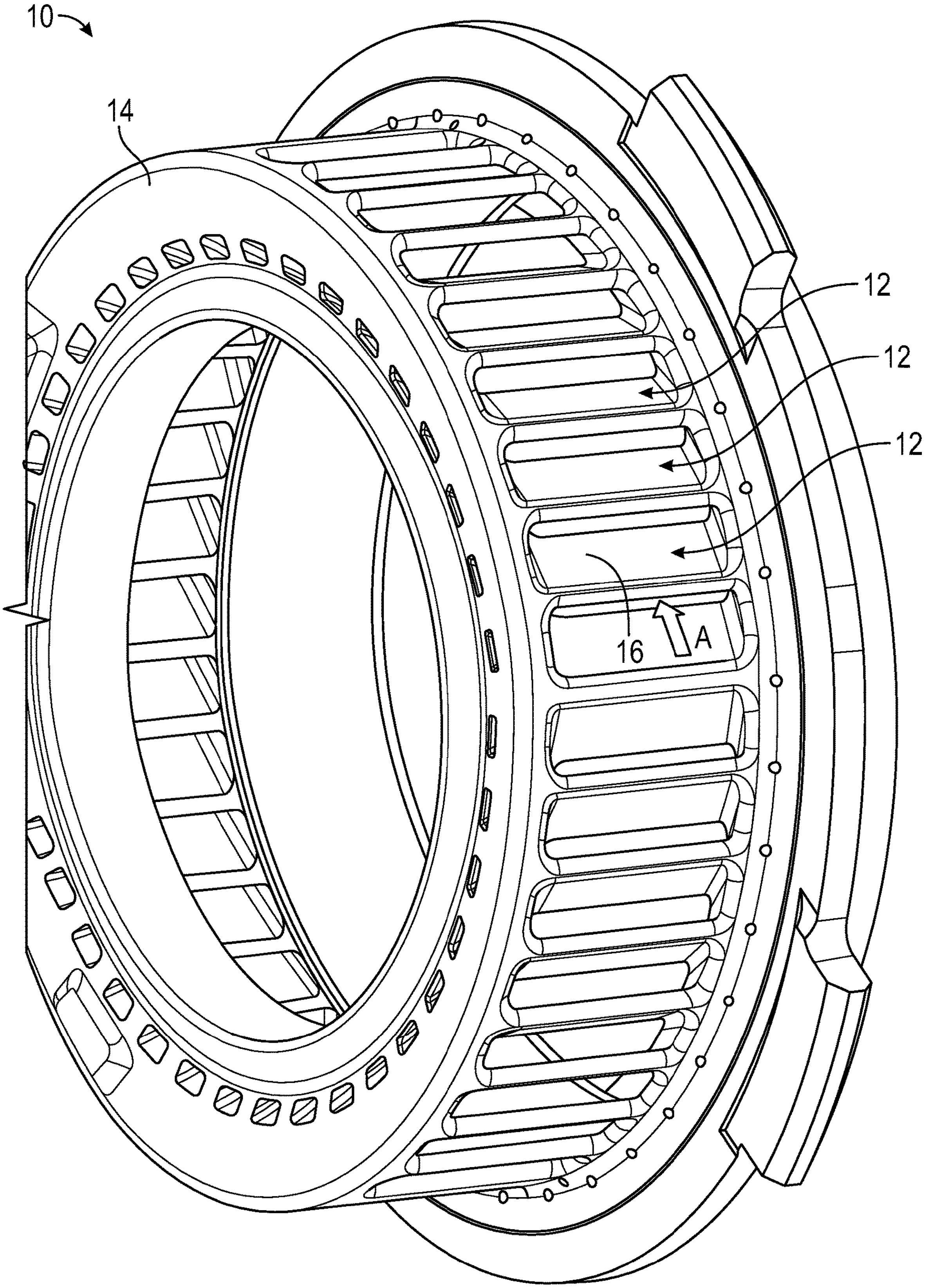
FIG. 1B shows a partial perspective view of a mixer for use with a combustion section, according to an embodiment of the present disclosure.

FIGS. 1A and 1B show a mixer 10 for a combustion section 30 of an engine. The combustion section 30 may be a gas turbine combustor. The mixer 10 may be a main mixer. The mixer 10 may provide an air flow A to mix with a fuel flow B from a fuel nozzle 40 of the engine. Additionally, or alternatively, a fuel flow may be provided with the air flow A. The mixer 10 may include a plurality of vanes 12. The vanes 12 may be placed circumferentially around a body 14 of the mixer 10. The mixer 10 may include a centerline such that the body 14 is an annular body, e.g., generally toroidal or donut shaped. As shown in FIG. 1B, the vanes 12 may be planar. That is, a surface 16 of the vanes 12 may be planar. The surface 16 of the vanes 12 may have no surface protrusions, indentations, or other features.

During operation, flow A through the mixer 10 may flow in the direction A across each of the vanes 12. The flow A may be an air flow. The flow A may be an air flow for mixing with a fuel flow to create a fuel-air mixture for providing to the combustion section 30 of the engine.

Figure 2A:
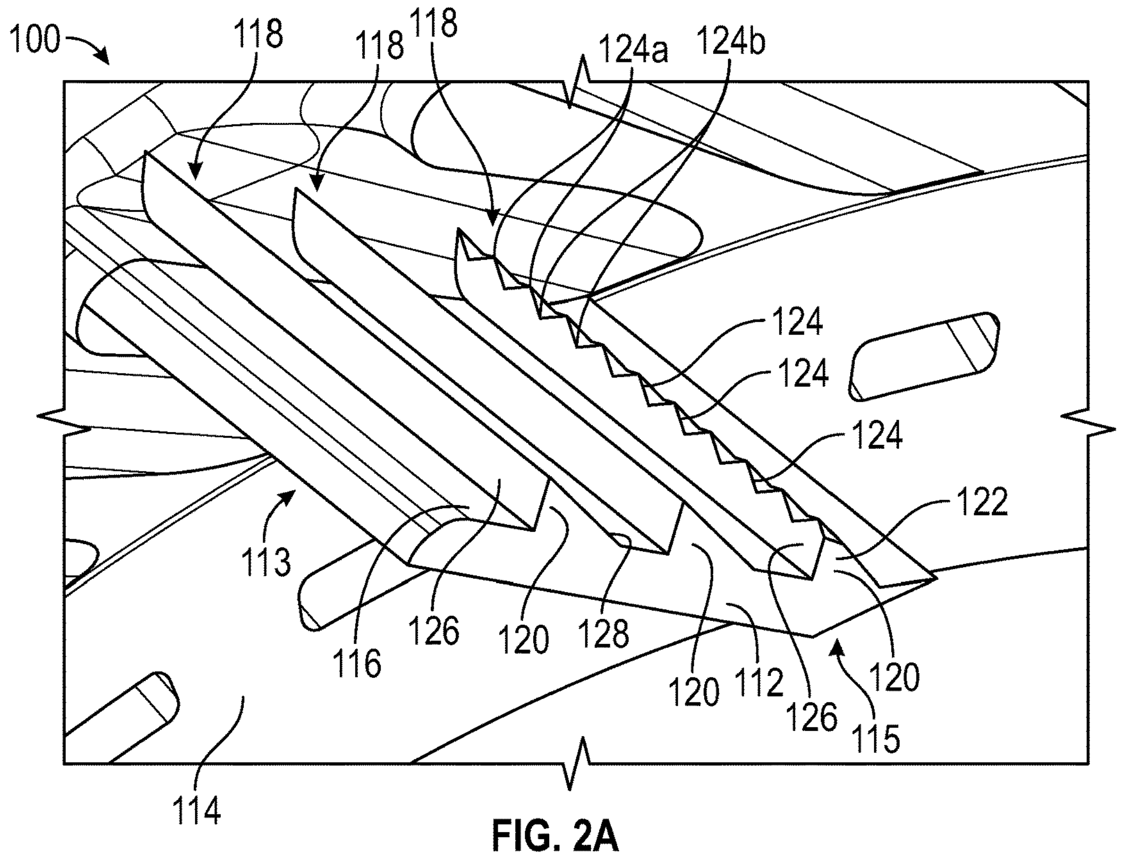
FIG. 2A shows a partial perspective view of a vane for a mixer, according to an embodiment of the present disclosure.
Figure 2B:
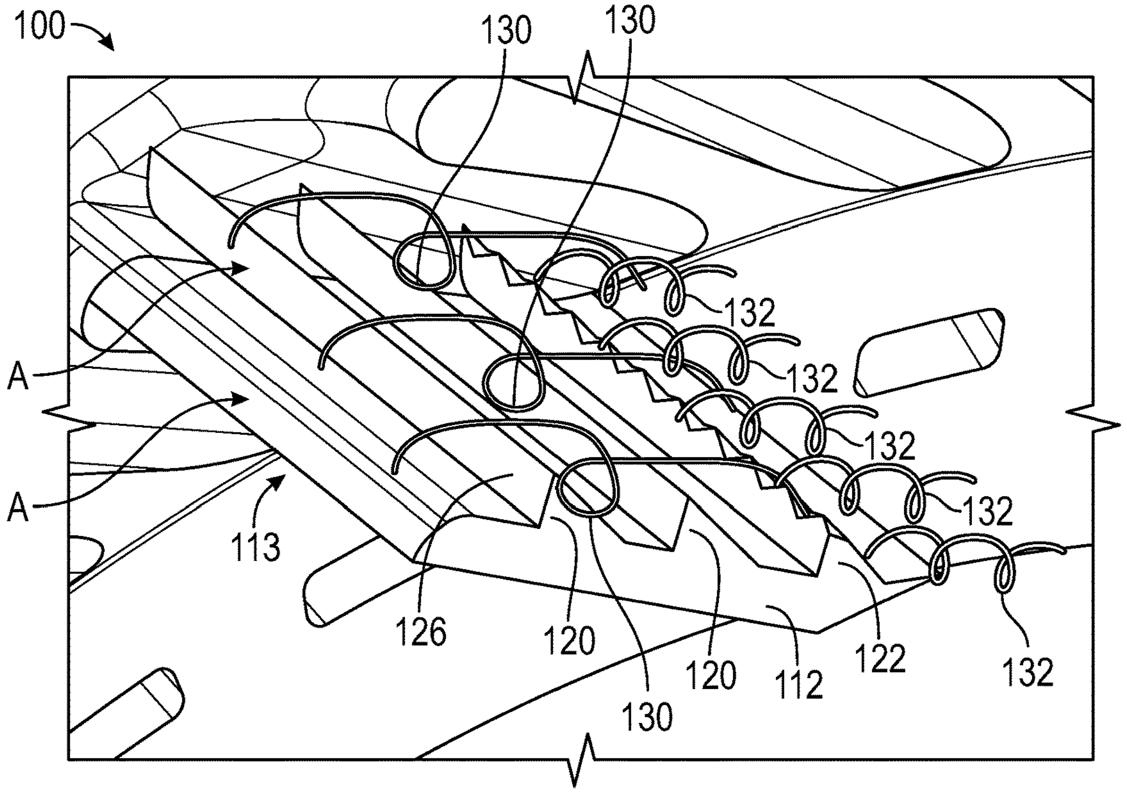
FIG. 2B shows a partial perspective view of the vane of FIG. 2A, according to an embodiment of the present disclosure.

FIGS. 2A and 2B show a mixer 100. The mixer 100 may be a main mixer. The mixer 100 may include a plurality of mixer vanes 112. The plurality of mixer vanes 112 may be placed circumferentially around a body 114 of the mixer 100. Although one mixer vane 112 is shown, a plurality of mixer vanes 112 may be placed around the circumference of the mixer 100 in a manner the same as, or similar to, the mixer 10 of FIG. 1.

Each mixer vane 112 may include a leading edge 113 and a trailing edge 115. The mixer vane 112 may include a surface 116. An air flow A may approach the leading edge 113, travel over the surface 116, and exit the mixer vane 112 at the trailing edge 115. One or more surface features 118 may be positioned on the surface 116. The surface features 118 may be integral with the surface 116 such that the surface features 118 and surface 116 are unitary. Alternatively, the surface features 118 may be coupled to the surface 116 (e.g., with a fastener, adhesive, weld, etc.). The surface features 118 may impart a particular flow characteristic to the air flow A. For example, the surface features 118 may induce vortices or eddies within the air flow A, as is described in more detail to follow.

With continued reference to FIGS. 2A and 2B, the surface feature 118 may include one or more wedges 120. The wedge 120 may be a generally triangular protrusion extending from the surface 116. The wedge 120 may include a first surface 126 and a second surface 128. The second surface 128 may be angled into the air flow A (FIG. 2B) flowing through the mixer 100. The first surface 126 may be perpendicular to the direction of air flow A. One or more of the wedges 120 may include a serrated wedge 122. The serrated wedge 122 may be a wedge including a nonplanar profile. For example, the serrated wedge 122 may include a wedge, such as the wedge 120, and further include serrations such as, for example, a plurality of teeth 124 that may form a saw tooth pattern. The plurality of teeth 124 may present a face on the first surface 126 to the air flow A, the face may have a rising (crest) and falling (trough) profile formed by the plurality of teeth. The plurality of teeth 124 may form a triangular profile. For example, the plurality of teeth 124 may include a plurality of crests 124*a* and a plurality of troughs 124*b*. The profile of the serrated wedge 122 may be perpendicular to the air flow A flowing across the mixer vane 112. That is, a first surface 126 of the serrated wedge 122 showing the profile may face or interact with the air flow A crossing the mixer vane 112. The profile may be formed by the serrations (e.g., the plurality of teeth 124) at a top portion of the wedge 120.

The wedges 120 may be spaced apart between the leading edge 113 and the trailing edge 115 of the mixer vane 112. The wedges 120 may be equally spaced such that a distance between adjacent wedges is equal. Alternatively, the wedges 120 need not be equally spaced such that a distance between adjacent wedges may or may not be equal.

FIGS. 2A and 2B show the wedge 120 as generally triangular. Other shapes, however, are contemplated, including, but not limited to, rounded triangles, semicircles, rectangular, trapezoid, polygon, or other shapes. The plurality of teeth 124 as shown as generally triangular, however other shapes are contemplated, including, but not limited, rounded triangles, semicircles, rectangular, trapezoid, polygon, or other shapes. Although shown as an upper surface, the surface 116 may also be a lower surface, such that the one or more surface features 118 may be present on the upper surface, lower surface, or both the upper surface and the lower surface. Although three wedges 120 are shown in FIGS. 2A and 2B, more or fewer may be provided. The wedge 120 may be a plain wedge 120. That is, the wedge 120 may include a profile that is planar. The wedge 120 may not include any serrations or other indentations or protrusions on the surface thereof. Although two wedges 120 with a planar profile and one serrated wedge 122 are shown in FIGS. 2A and 2B, any combination of plain wedges 120 and serrated wedges 122 may be provided. Although the wedges 120 with a planar profile are shown toward the leading edge 113 of the mixer vane 112 and the serrated wedge 122 toward the trailing edge 115, any order of the wedges 120 and 122 may be provided. For example, the serrated wedge 122 may be toward the leading edge 113 and/or may be interspersed between plain wedges 120.

During operation, and as shown in FIG. 2B, the air flow A may flow through the mixer 100 across the mixer vanes 112. As the air flow A approaches the first of the wedges 120, the air flow may impinge upon the first surface 126 creating vortices 130, also referred to as eddies 130. The air flow A continues along the mixer vane 112 toward the serrated wedge 122. As the air flow impinges on the plurality of teeth 124 of the serrated wedge 122, vortices 132, also referred to as eddies 132, are created. The plain wedge, e.g., wedge 120, may create larger eddies 130 than those generated by the serrated wedge 122. As the air flow continues to flow across the mixer vane 112, the serrated wedge 122 may further break the eddies 130 into smaller eddies 132. This may improve turbulence and enhance fuel-air mixing in the mixer 100. Additionally, this may reduce $NO_x$ emissions.

Figure 3A:
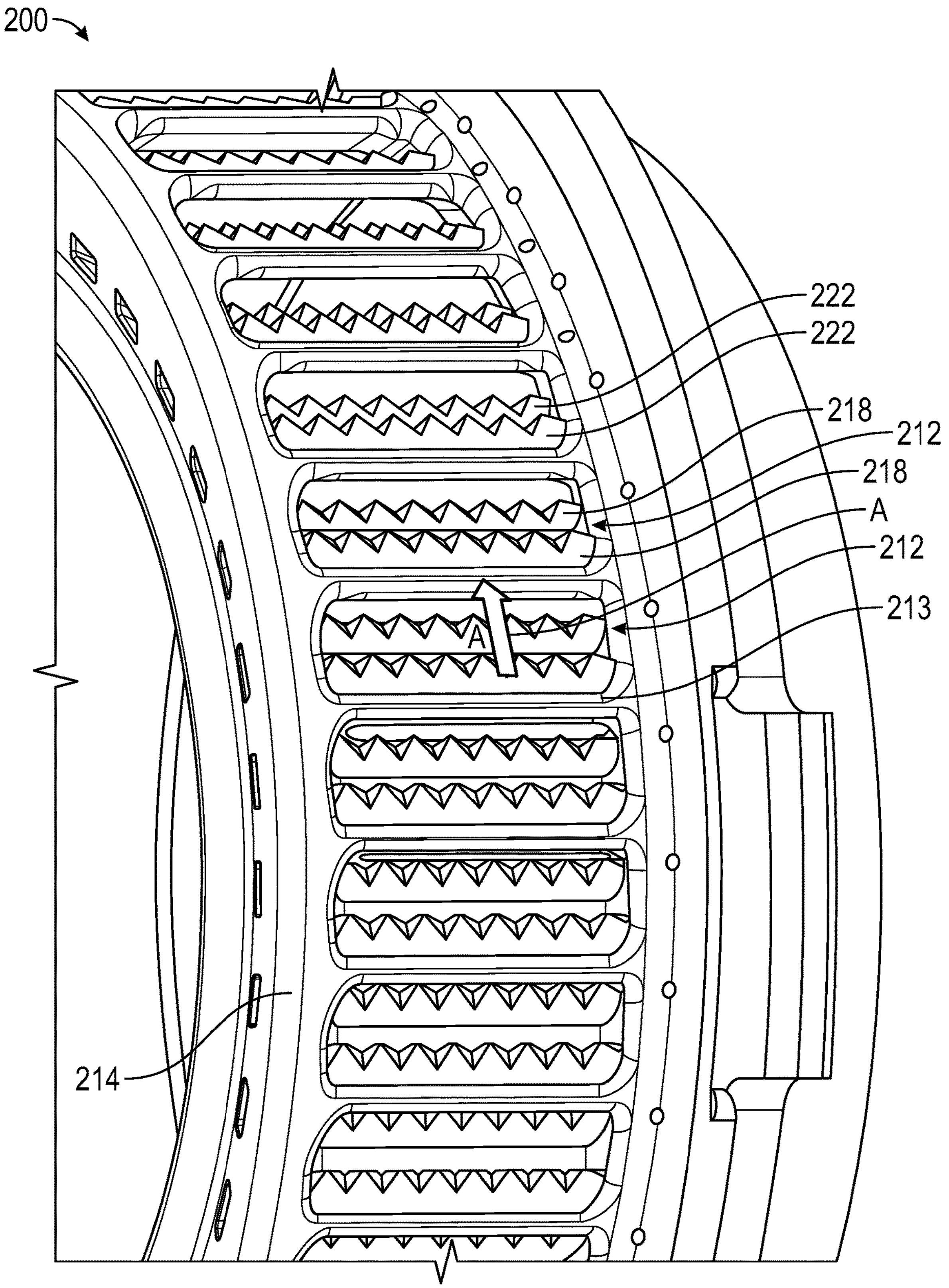
FIG. 3A shows a partial perspective view of a mixer, according to an embodiment of the present disclosure.
Figure 3B:
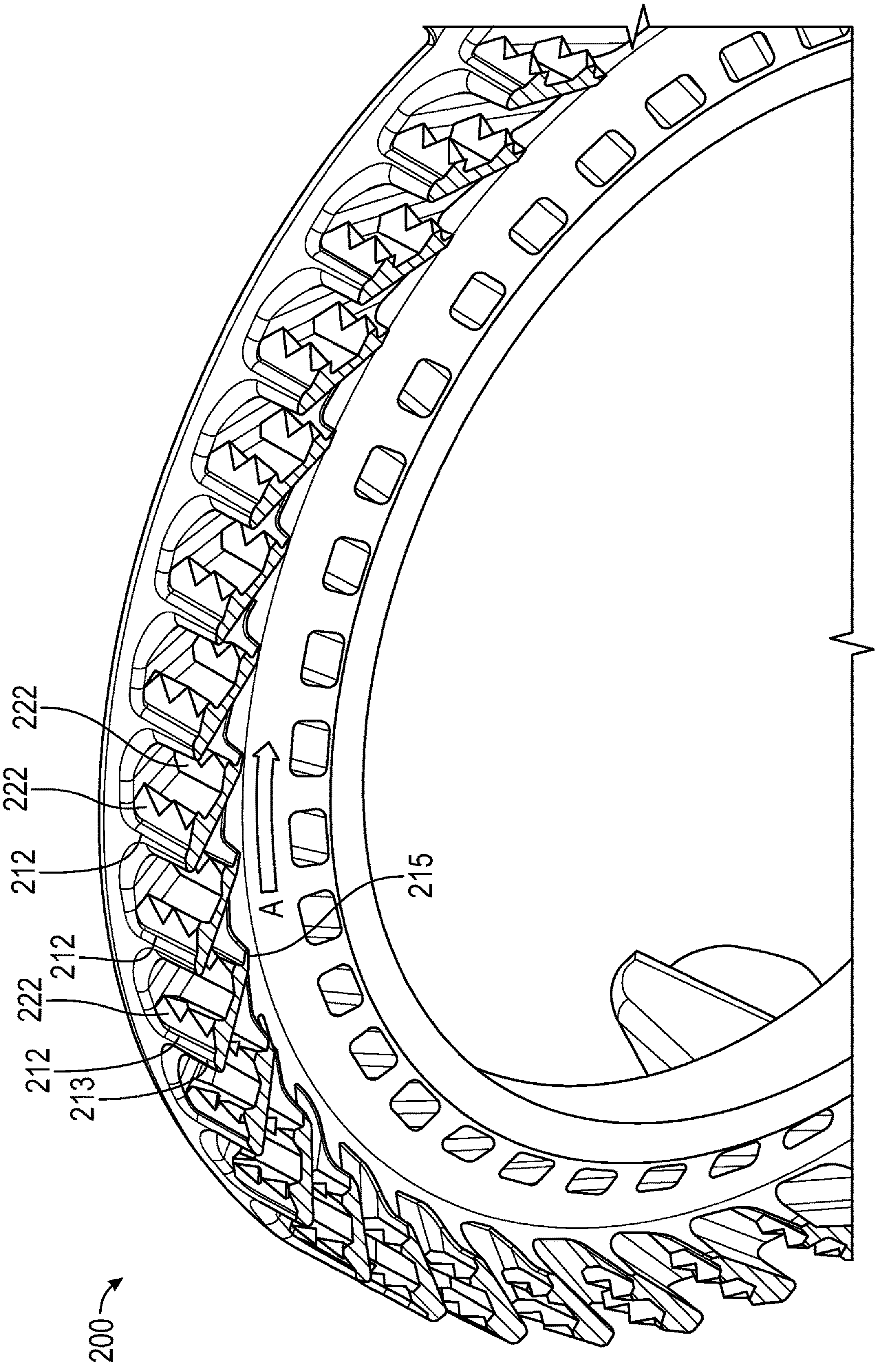
FIG. 3B shows a partial cross-sectional view of the mixer of FIG. 3A, taken along a centerline of the mixer, according to an embodiment of the present disclosure.

FIGS. 3A and 3B show a mixer 200. The mixer 200 may be a main mixer. The mixer 200 may include a plurality of mixer vanes 212 circumferentially spaced around a body 214 of the mixer 200. The plurality of mixer vanes 212 that may be the same as, or similar to, the mixer vanes 112 of the mixer 100. In the mixer 200, the mixer vanes 212 may include a leading edge 213 and a trailing edge 215. An air flow A may approach the leading edge 213, travel over a surface of the mixer vane 212 and exit the mixer vane 212 at the trailing edge. Similar to the mixer vanes 112, the mixer vanes 212 may include one or more surface features 218. In the mixer 200, the one or more surface features 218 may be serrated wedges 222. Although two serrated wedges 222 are shown for each mixer vane 212, more or fewer may be provided. The surface features 218, e.g., the serrated wedges 222, may be attached to the mixer vanes 212 in a manner similar to, or the same, as described with respect to surface features 118. The serrated wedges 222 may induce vortices or eddies within the air flow A, as is described with respect to FIGS. 2A and 2B.

Figure 4A:
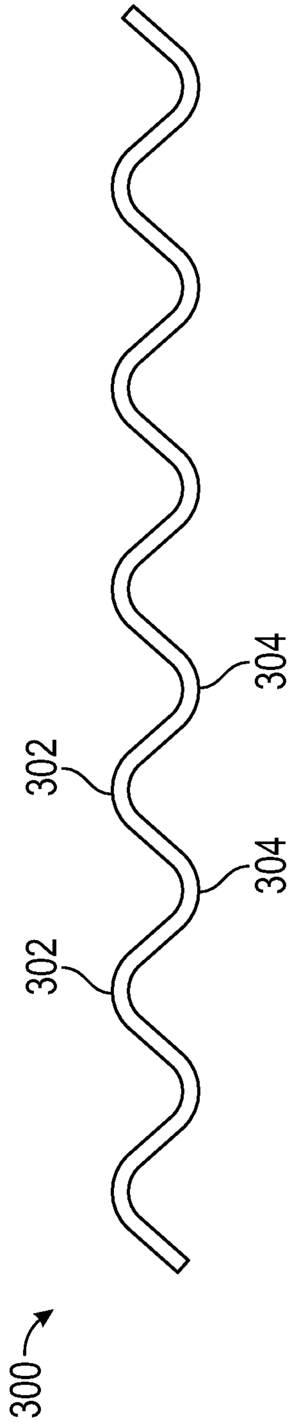
FIG. 4A shows a schematic of a vane profile, according to an embodiment of the present disclosure.
Figure 4B:
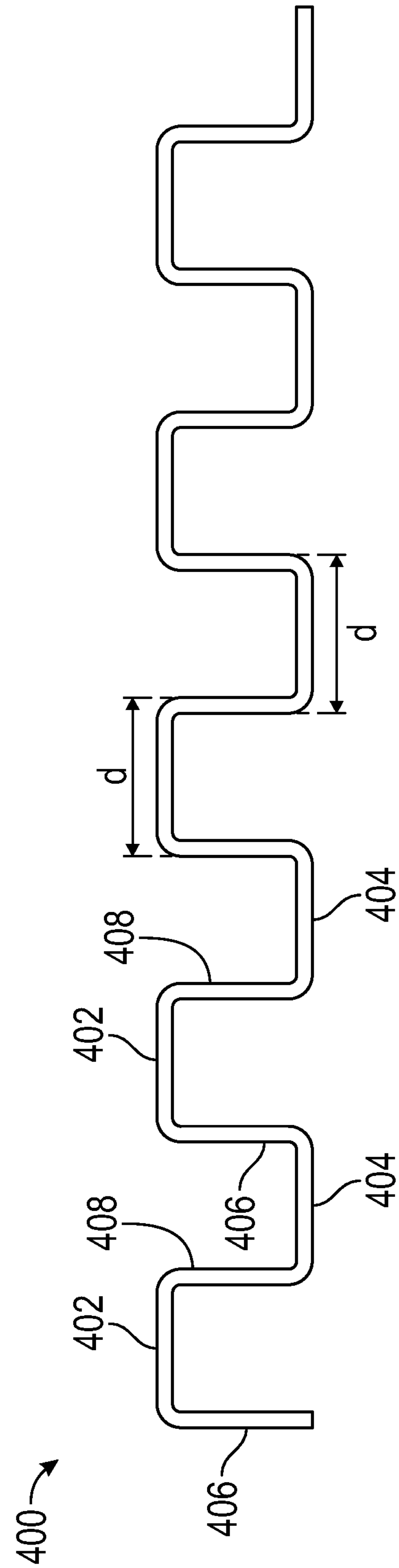
FIG. 4B shows a schematic of a vane profile, according to an embodiment of the present disclosure.

FIGS. 4A and 4B show exemplary profiles for a serrated wedge on mixer vanes 112 and/or mixer vanes 212. That is, one or more vanes on a mixer (e.g., mixer 100 and/or mixer 200) may include a serrated wedge having a profile such as shown in FIGS. 4A and 4B. In FIG. 4A, the profile 300 may include a curved or sinusoidal shape. The profile 300 may include a plurality of peaks or crests 302 and valleys or troughs 304. In contrast to the pointed, triangular profile of the serrated wedges 122 and 222, the profile 300 may provide a rounded or curved crest and trough. In FIG. 4B, the profile 400 may include a rectangular shape. The profile 400 may include a plurality of peaks or crests 402 and valleys or troughs 404. The crests 402 and troughs 404 may be substantially flat or planar and may extend a distance d between the rising edge 406 and the falling edge 408. The profiles described in FIGS. 4A and 4B are exemplary, and other profiles are contemplated, such as, for example, square, triangle, wavy, U-shape, inverted U-shape, sine wave, cosine wave, etc. The profiles may be nonlinear. The profiles described in FIGS. 4A and 4B may be provided to any of the surface features, vanes, or wedges described herein.

A wedge with a profile (e.g., serrated wedge 222 or a wedge employing the profiles of FIGS. 4A and 4B), may create higher turbulence than a plain wedge, which may enhance fuel-air mixing. The crests and troughs of the profiles may break-up larger vortices (e.g., coherent shed swirler vortices formed by the wedges) present in the mixer. The smaller, amorphous structures formed by the serrated wedge profile may diffuse and smear out fuel-air equivalence ratio temporal waves that are leaving the mixer. This may reduce the fluctuating heat release that may couple with discrete combustor acoustic modes.

Figure 5A:
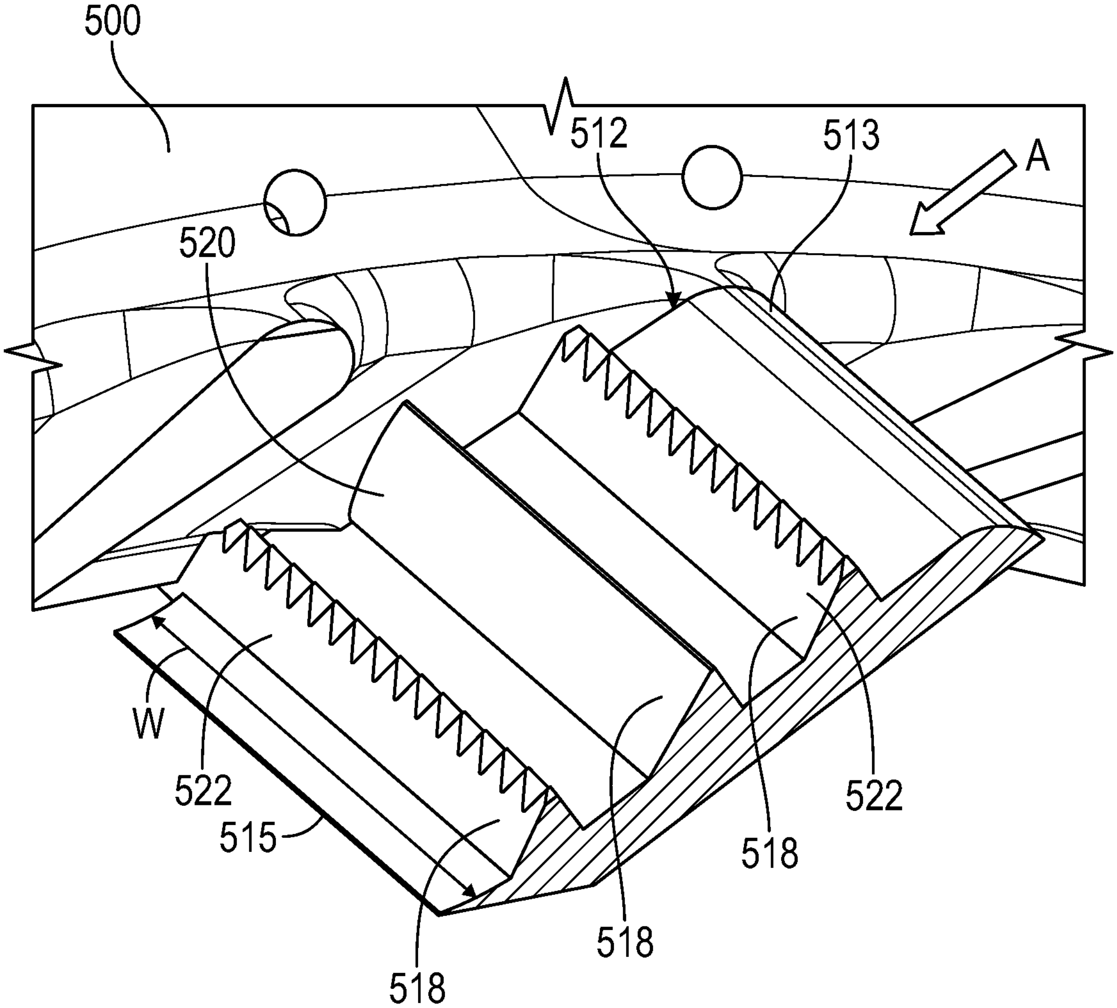
FIG. 5A shows a partial cross-sectional view of a vane for a mixer, taken through a centerline of the vane, according to an embodiment of the present disclosure.
Figure 5B:
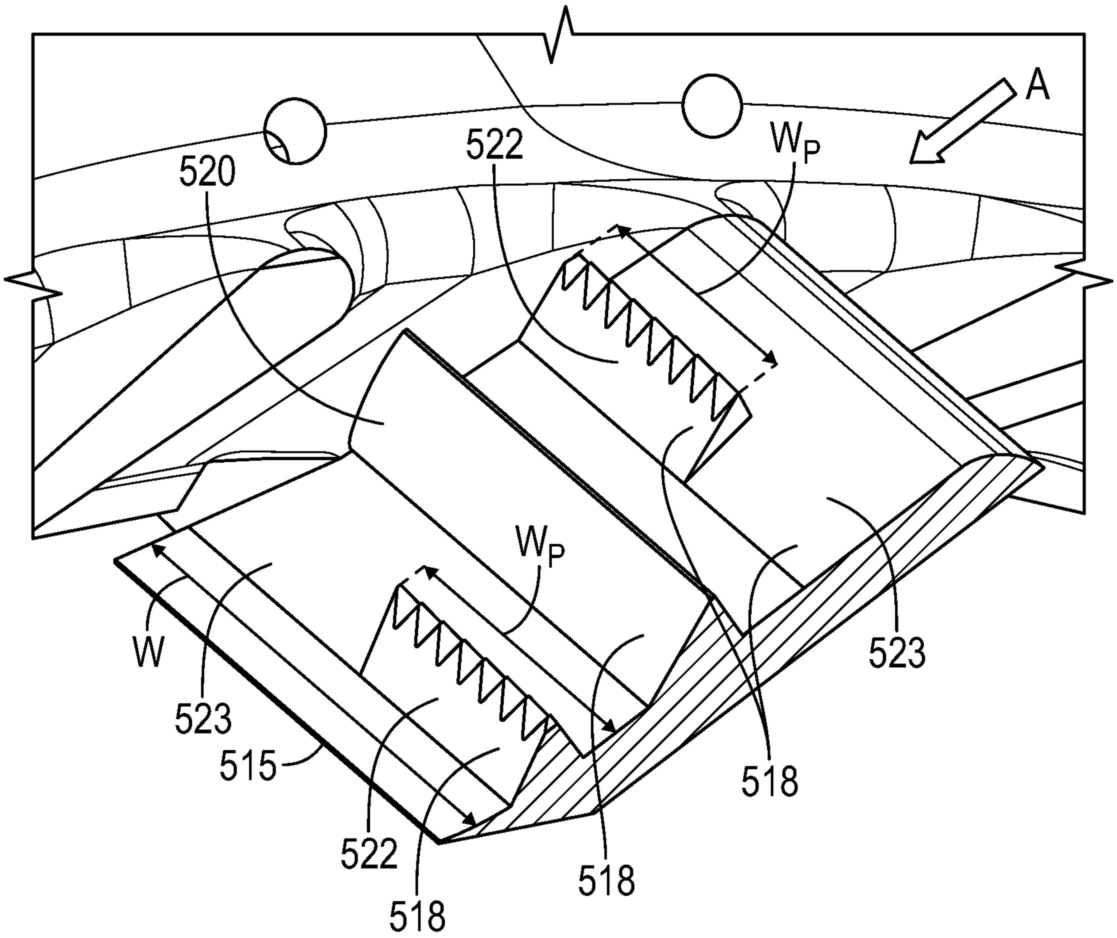
FIG. 5B shows a partial cross-sectional view of a vane for a mixer, taken through a centerline of the vane, according to an embodiment of the present disclosure.
Figure 5C:
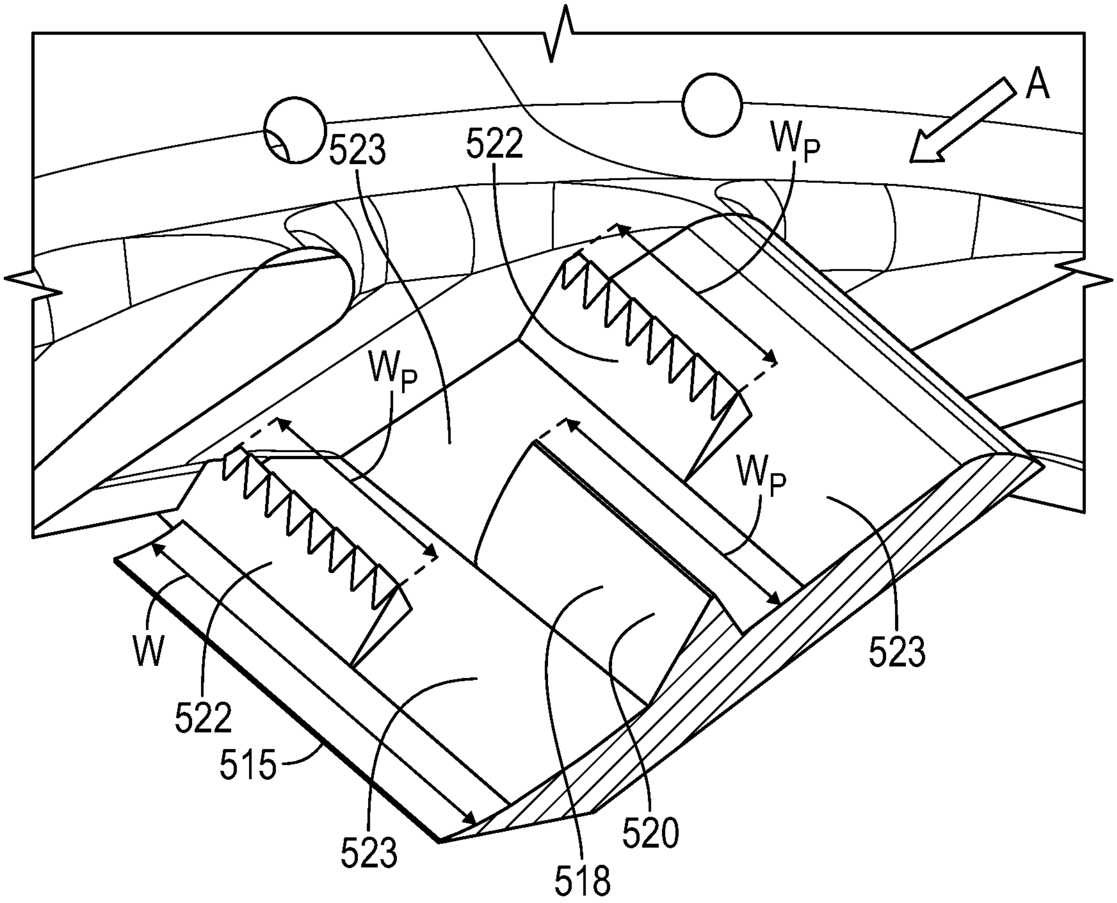
FIG. 5C shows a partial cross-sectional view of a vane for a mixer, taken through a centerline of the vane, according to an embodiment of the present disclosure.

FIGS. 5A to 5C show yet another example of a mixer 500, which may be a main mixer, having a plurality of mixer vanes 512. Although one mixer vane 512 is shown, a plurality of mixer vanes 512 may extend around the body of the mixer 500, similar to those shown in FIGS. 1, 2A, and 2B. In the mixer 500, the mixer vanes 512 may include a leading edge 513 and a trailing edge 515. An air flow A may approach the leading edge 513, travel over a surface of the mixer vane 512 and exit the mixer vane 512 at the trailing edge. Similar to the mixer vanes 112 and the mixer vanes 212, the mixer vanes 512 may include one or more surface features 518. In the mixer 500, the one or more surface features 518 may be plain wedges 520 (e.g., wedges with a planar profile) and serrated wedges 522 (e.g., wedges with a nonplanar profile). Although two serrated wedges 522 are shown with a plain wedge 520 located therebetween, other arrangements or numbers of surface features 518 may be provided. For each mixer vane 512, more or fewer wedges or surface features 518 may be provided. The surface features 518, e.g., the serrated wedges 522 and the plain wedges 520, may be attached to the mixer vanes 512 in a manner similar to, or the same, as described with respect to surface features 118. The plain wedges 520 and the serrated wedges 522 may induce vortices or eddies within the air flow A, as is described with respect to FIGS. 2A and 2B.

In FIGS. 5A to 5C, each mixer vane 512, and thus each surface of the mixer vane 512, may include a width W that extends from a radially inner side of the mixer vane 512 to a radially outer side of the mixer vane 512. In FIG. 5A, the one or more surface features 518 may extend along an entire width W of the mixer vane 512. For example, the plain wedge 520 and the serrated wedge 522 may extend along an entire width W of the mixer vane 512, from the radially inner side of the mixer vane 512 to a radially outer side of the mixer vane 512.

In the example of FIG. 5B, one or more of the one or more surface features 518 may extend along a partial width Wp of the mixer vane 512. The one or more surface features 518 extending along the partial width $W_P$ may result in a portion 523 of the surface of the mixer vane 512 having no surface feature thereon. For example, the serrated wedges 522 may extend along a partial width Wp and the plain wedge 520 may extend along the entire width W. In some examples, one or more of the one or more surface features 518 may extend along the partial width Wp from the radially inner side (e.g., the serrated wedge 522 near the trailing edge 515) and one or more of the one or more surface features 518 may extend along the partial width Wp from the radially outer side (e.g., the serrated wedge 522 near the leading edge 513). Alternatively, this orientation may be reversed. Alternatively, the one or more surface features 518 may extend along the partial width Wp from the same side (e.g., from the radially inner side or the radially outer side). The partial width $W_P$ may be half of the width W. Alternatively, the partial width Wp may be a percentage of the width W, such as, for example, 25%, 33%, 50%, 66%, 75%, or 90%, or any range from 0% to 100%.

In the example of FIG. 5C, one or more of the one or more surface features 518 may extend along a partial width Wp of the mixer vane 512. The one or more surface features 518 extending along the partial width $W_P$ may result in a portion 523 of the surface of the mixer vane 512 having no surface feature thereon. For example, the serrated wedges 522 may extend along a partial width Wp and the plain wedge 520 may extend along a partial width Wp. In some examples, one or more of the one or more surface features 518 may extend along the partial width Wp from the radially inner side (e.g., the plain wedge 520) and one or more of the one or more surface features 518 may extend along the partial width Wp from the radially outer side (e.g., the serrated wedge 522). Alternatively, this orientation may be reversed. Alternatively, the one or more surface features 518 may extend along the partial width Wp from the same side (e.g., from the radially inner side or the radially outer side). The partial width $W_P$ may be half of the width W. Alternatively, the partial width Wp may be a percentage of the width W, such as, for example, 25%, 33%, 50%, 66%, 75%, or 90%, or any range from 0% to 100%.

Accordingly, one or more of the one or more surface features 518 may extend along a partial width Wp, along the entire width W, have a nonplanar profile (e.g., serrated wedges 522) or have a planar profile (e.g., plain wedges 520), or any combination thereof. In the example of FIG. 5A, air flow A at a particular location may pass through an entire section of each wedge. That is, the air flow A crossing a particular mixer vane 512 may pass through one or more surface feature 518 at every location along the width W of the mixer vane 512. In the examples of FIGS. 5B and 5C, the air flow A crossing the mixer vane 512 may pass through only a portion of the one or more surface features 518, with a portion of the air flow A passing over the portion 523 of the surface with no surface feature 518. This may further increase turbulent kinetic energy (as compared to FIG. 5A).

Figure 6:
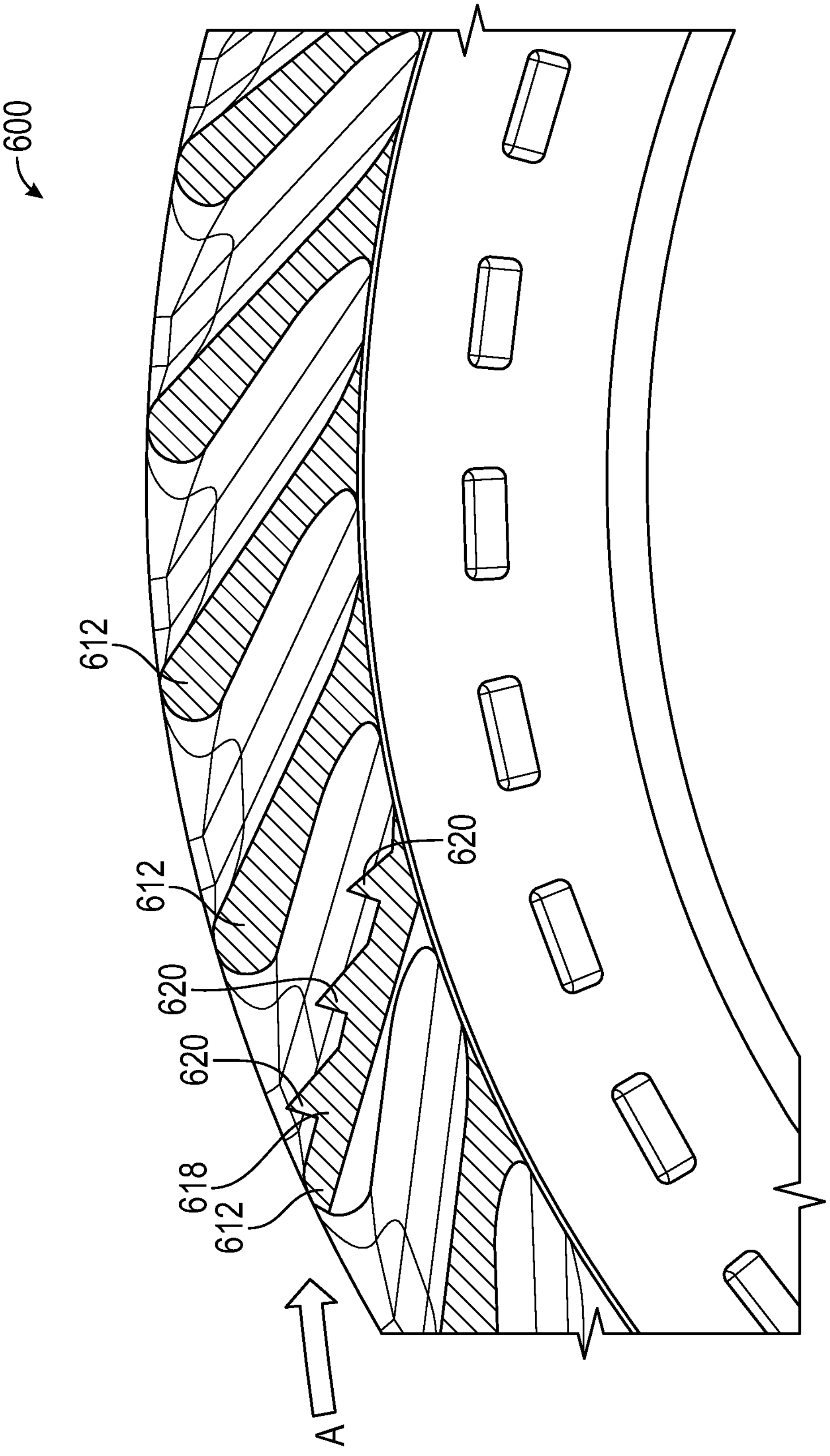
FIG. 6 shows a partial cross-sectional view of a mixer, taken through a centerline of the mixer, according to an embodiment of the present disclosure.

FIG. 6 shows yet another example of a mixer 600, which may be the same as or similar to any of the mixers discussed herein. In the mixer 600, the mixer vanes 612 may include three plain wedges 620 as the surface features 618. However, more or fewer wedges 620 may be provided. Additionally, one or more of the wedges 620 may include a profile (e.g., triangular as shown in FIGS. 2A and 2B, sinusoidal as shown in FIG. 4A, or rectangular as shown in FIG. 4B). The one or more wedges 620 may induce vortices or eddies within the air flow A, as described with respect to FIGS. 2A and 2B.

Figure 7:
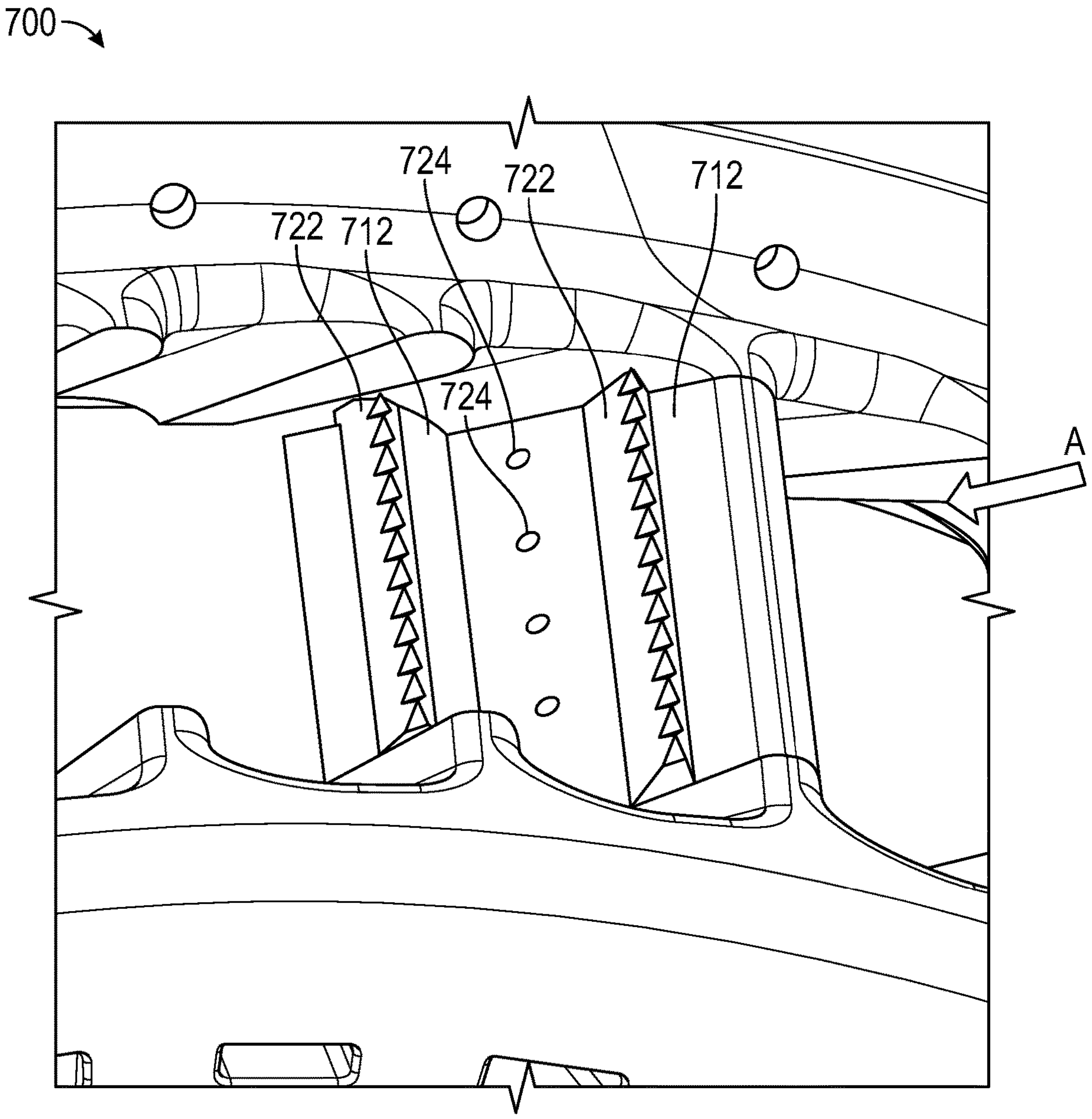
FIG. 7 shows a partial perspective view of a mixer, according to an embodiment of the present disclosure.

FIG. 7 shows yet another example of a mixer 700, which may be the same as or similar to any of the mixers herein. In the mixer 700, the mixer vanes 712 may include two serrated wedges 722 as the surface features. However, more or fewer serrated wedges 722 may be provided. Additionally, although depicted as serrated wedges 722 with a triangular profile, the serrated wedges 722 may include other profiles (e.g., sinusoidal as shown in FIG. 4A or rectangular as shown in FIG. 4B). The mixer vanes 712 may include one or more openings 724 in the surface of the mixer vane 712 between the one or more serrated wedges 722. The openings 724 may be a surface feature on the mixer vanes 712. The openings 724 may be shaped holes. The openings 724 may be provided in between wedges to allow the air to flow or to wash to the bottom surface of the mixer vane 712. The openings 724 may be provided at an angle different from the vane angle. This may further enhance turbulence levels. The openings 724, although shown in an embodiment with serrated wedges 722, may be provided with plain wedges. The one or more serrated wedges 722 may induce vortices or eddies within the air flow A, as is described with respect to FIGS. 2A and 2B. Alternatively, or additionally, the one or more openings 724 may be provided on one or more of the serrated wedges 722.

Any of the wedges described herein may be continuous wedges or may be discrete wedges. Any of the surface features described herein may be retrofitted in a mixer without surface features. Any of the surface features and/or vanes with integral surface features may be formed with additive printing.

In the wedges of the present disclosure, the slope, height, number, distance between wedges, etc., may be altered and may be selected to achieve a desired fuel-air mixing. The wedges of the present disclosure are present on the same vane may have the same or different construction. In some examples, the wedges may decrease in height from a leading edge of the vane to the trailing edge of the vane.

The serrations provided on the wedges may have alternate directions along the length of the wedge, shapes (e.g., square, triangle, wavy, U-shape, inverted U-shape, sine wave, cosine wave, etc.), orientations, heights, slopes, or any combination thereof. The serrations may be provided normal or perpendicular to the air flow. That is, a surface of the wedge having the profile may face the flow, such that the flow may pass over the crests and through the troughs of the profile.

Although shown on an upper surface of the vane, the surface features (e.g., wedges), may be provided on the bottom surface or on both the upper surface and the bottom surface of the vane. Serrations may be provided on the upper and lower surface of the vane. This may further enhance the turbulent kinetic energy level.

Any of the embodiments described herein may be combined or replaced with all or portions of any other embodiment herein. That is, for example, surface features (e.g., wedges, profiles, and/or openings) may be provided to each vane (either the same arrangement to all vanes or different arrangements between one or more vanes on a mixer) in any combination. The combinations of serrations, number of wedges, number of wedges with serrations, number of wedges without serrations, number of serrations on a wedge, angles, height, distance between wedges, etc., may be optimized based on the required level of turbulent kinetic energy.

The surface features described herein may enhance fuel-air mixing in the mixers and may reduce $NO_x$ emissions. The profile (e.g., serration) on the wedges of the mixer vanes may be provided in the flow direction. That is, the face of the profile may be presented to the flow. The surface features on the wedges may allow for the mixer length to be reduced as compared to a mixer without surface features. This may achieve the same fuel-air mixing while reducing the weight and cost. This may result in a compact combustor. The mixer vanes described herein may be improve premixing in lean combustors. The addition of serrated wedges on the mixer vane may improve turbulent kinetic energy and thus may improve fuel-air mixing, which may result in a $NO_x$ benefit.

Further aspects of the present disclosure are provided by the subject matter of the following clauses.

A main mixer for a gas turbine combustor includes an annular mixer body and a plurality of mixer vanes located circumferentially around the annular mixer body. Each mixer vane of the plurality of mixer vanes includes a leading edge, a trailing edge, a surface extending between the leading edge and the trailing edge, and one or more surface features extending radially outward from the surface. The one or more surface features are configured to create vortices in an air flow that flows across the mixer vane. At least one of the one or more surface features includes a profile extending perpendicular to the air flow, the profile configured to break down the vortices into smaller vortices.

The main mixer according to any preceding clause, the surface having a width extending from a radially inner side of the mixer vane to a radially outer side of the mixer vane, wherein one or more of the one or more surface features extends along the entire width of the surface.

The main mixer according to any preceding clause, the surface having a width extending from a radially inner side of the mixer vane to a radially outer side of the mixer vane, wherein one or more of the one or more surface features extends along less than the width of the surface.

The main mixer according to any preceding clause, the surface having a width extending from a radially inner side of the mixer vane to a radially outer side of the mixer vane, wherein one or more of the one or more surface features extends along half of the width of the surface.

The main mixer according to any preceding clause, wherein the one or more surface features comprises a first wedge and a second wedge, each of the first wedge and the second wedge including the profile, the profile being formed by serrations.

The main mixer according to any preceding clause, wherein the one or more surface features comprises a first wedge, a second wedge, and a third wedge, wherein the first wedge and the third wedge include a profile formed by serrations, and wherein the second wedge is a plain wedge with a planar profile.

The main mixer according to any preceding clause, further comprising one or more shaped holes located on the surface between adjacent surface features of the one or more surface features, the one or more shaped holes configured to allow the air flow to flow or to wash to a bottom surface of each of the plurality of mixer vanes.

The main mixer according to any preceding clause, wherein the profile, in shape, is square, triangle, wavy, U-shape, inverted U-shape, sine wave, cosine wave, or any combination thereof.

The main mixer according to any preceding clause, wherein the profile is a non-linear profile.

The main mixer according to any preceding clause, wherein the one or more surface features extends radially away from a center of the main mixer on an upper surface of each of the plurality of mixer vanes.

The main mixer according to any preceding clause, wherein the one or more surface features extends radially toward a center of the main mixer on a lower surface of each of the plurality of mixer vanes.

The main mixer according to any preceding clause, wherein the one or more surface features comprises one or more wedges.

The main mixer according to any preceding clause, wherein each of the one or more surface features is a wedge extending radially from the surface of each of the plurality of mixer vanes.

The main mixer according to any preceding clause, wherein the profile is formed by a series of serrations on a top portion of the wedge.

The main mixer according to any preceding clause, wherein the one or more surface features comprises a first wedge, a second wedge, and a third wedge, and wherein the first wedge, the second wedge, and the third wedge are spaced apart between the leading edge and the trailing edge.

The main mixer according to any preceding clause, wherein the first wedge and the second wedge are each plain wedges with a planar profile and the third wedge includes the profile, and wherein the first wedge and the second wedge generate a first set of vortices in the air flow and the third wedge breaks down the first set of vortices into a second set of vortices smaller than the first set of vortices.

The main mixer according to any preceding clause, wherein the profile is a plurality of serrations such that the third wedge is a serrated wedge.

The main mixer according to any preceding clause, wherein each of the one or more surface features are integral with the surface such that each of the one or more surface features and the surface are unitary.

A gas turbine combustor includes a fuel nozzle configured to provide a fuel flow to the combustor and a main mixer configured to provide an air flow to the combustor. The main mixer includes an annular mixer body, a plurality of mixer vanes located circumferentially around the annular mixer body, and a plurality of wedges extending radially outward from each of the plurality of mixer vanes, at least one of the plurality of wedges on each of the plurality of mixer vanes including serrations. The air flow is configured to enter the main mixer at a leading edge of each of the plurality of mixer vanes, flow over the plurality of wedges on each of the plurality of mixer vanes, and exit the mixer vanes at a trailing edge of each of the plurality of mixer vanes. The air flow and the fuel flow are configured to be mixed to form a fuel-air flow. The plurality of wedges are configured to create vortices in the air flow to provide a uniform fuel-air flow.

The main mixer according to any preceding clause, wherein the serrations are configured to break down the vortices into smaller vortices.

The main mixer according to any preceding clause, wherein the plurality of wedges extends radially from a surface of each of the plurality of mixer vanes.

The main mixer according to any preceding clause, wherein the plurality of wedges extending radially outward from each of the plurality of mixer vanes include a first wedge, a second wedge, and a third wedge, and wherein the first wedge and the second wedge are each plain wedges with no serrations and the third wedge includes the serrations.

The main mixer according to any preceding clause, wherein the plurality of wedges on each of the plurality of mixer vanes includes a first wedge and a second wedge, each of the first wedge and the second wedge including serrations.

The main mixer according to any preceding clause, wherein the plurality of wedges on each of the plurality of mixer vanes includes a first wedge, a second wedge, and a third wedge, wherein the first wedge and the third wedge include serrations, and wherein the second wedge is a plain wedge with no serrations.

The main mixer according to any preceding clause, further comprising one or more shaped holes located between adjacent wedges of the plurality of wedges, the one or more shaped holes configured to allow the air flow to flow or to wash to a bottom surface of each of the plurality of mixer vanes.

The main mixer according to any preceding clause, wherein the serrations, in shape, are square, triangle, wavy, U-shape, inverted U-shape, sine wave, cosine wave, or any combination thereof.

The main mixer according to any preceding clause, wherein the plurality of wedges extend radially away from a center of the main mixer on an upper surface of each of the plurality of mixer vanes.

The main mixer according to any preceding clause, wherein the plurality of wedges extend radially toward a center of the main mixer on a lower surface of each of the plurality of mixer vanes.

Although the foregoing description is directed to the preferred embodiments, it is noted that other variations and modifications will be apparent to those skilled in the art, and may be made without departing from the spirit or scope of the disclosure. Moreover, features described in connection with one embodiment may be used in conjunction with other embodiments, even if not explicitly stated above.

The invention claimed is:

1. A main mixer for a gas turbine combustor, the main mixer comprising:

an annular mixer body;

a plurality of mixer vanes located circumferentially around the annular mixer body, each mixer vane of the plurality of mixer vanes including:

(a) a leading edge;

(b) a trailing edge;

(c) a surface extending between the leading edge and the trailing edge; and (d) a plurality of surface features extending radially outward from the surface, at least one of the plurality of surface features having a non-linear profile perpendicular to an air flow that flows across the mixer vane from the leading edge to the trailing edge, wherein the plurality of surface features are configured to create vortices in the air flow that flows across the mixer vane from the leading edge to the trailing edge, and wherein the non-linear profile extends perpendicular to the air flow to break down the vortices into smaller vortices.

2. The main mixer of claim 1, the surface having a width extending from a first side of the leading edge to a second side of the leading edge, wherein the at least one of the plurality of surface features extends along the entire width of the surface.

3. The main mixer of claim 1, the surface having a width extending from a first side of the leading edge to a second side of the leading edge, wherein the at least one of the plurality of surface features extends along less than the entire width of the surface.

4. The main mixer of claim 1, wherein the at least one of the plurality of surface features comprises the entirety of the plurality of surface features and the plurality of surface features comprises a first wedge and a second wedge, each of the first wedge and the second wedge including the non-linear profile, the non-linear profile being formed by serrations.

5. The main mixer of claim 1, wherein the at least one of the plurality of surface features comprises the entirety of the plurality of surface features and the plurality of surface features comprises a first wedge, a second wedge, and a third wedge, wherein the first wedge and the third wedge include the non-linear profile, the non-linear profile formed by serrations, and wherein the second wedge is a plain wedge with a planar profile.

6. The main mixer of claim 1, wherein the surface of each of the mixer vanes comprises a radially outward facing surface and a radially inward facing surface, at least one mixer vane further comprising one or more shaped holes located on the radially outward facing surface between adjacent surface features of the plurality of surface features, the one or more shaped holes configured to allow the air flow to flow or to wash to the radially inward facing surface of the at least one mixer vane.

7. The main mixer of claim 1, wherein the non-linear profile is, in shape, square, triangle, wavy, U-shape, inverted U-shape, sine wave, cosine wave, or any combination thereof.

8. The main mixer of claim 1, wherein the surface of each of the mixer vanes comprises a radially outward facing surface and a radially inward facing surface, wherein the plurality of surface features of at least one mixer vane extends radially away from a center of the main mixer on the radially outward facing surface of each of the plurality of mixer vanes and/or wherein the plurality of surface features extends radially toward the center of the main mixer on the radially inward facing surface of each of the plurality of mixer vanes.

9. The main mixer of claim 1, wherein each of the plurality of surface features of at least one mixer vane is a wedge extending radially outward from the surface of each of the plurality of mixer vanes, and wherein the non-linear profile is formed by a series of serrations on a radially outer portion of the wedge.

10. The main mixer of claim 1, wherein each of the plurality of surface features of at least one mixer vane are integral with the surface such that each of the plurality of surface features and the surface are unitary.

11. The main mixer of claim 1, wherein the plurality of surface features of at least one mixer vane comprises a first wedge, a second wedge, and a third wedge, and wherein the first wedge, the second wedge, and the third wedge are spaced apart between the leading edge and the trailing edge, wherein the first wedge and the second wedge are each plain wedges with a planar profile and the third wedge includes the non-linear profile, wherein the first wedge and the second wedge generate a first set of vortices in the air flow and the third wedge breaks down the first set of vortices into a second set of vortices smaller than the first set of vortices, and wherein the non-linear profile is a plurality of serrations such that the third wedge is a serrated wedge.

12. A gas turbine combustor comprising:

a fuel nozzle configured to provide a fuel flow to the combustor; and a main mixer configured to provide an air flow to the combustor, the main mixer comprising:

(a) an annular mixer body;

(b) a plurality of mixer vanes located circumferentially around the annular mixer body, each mixer vane of the plurality of mixer vanes having a leading edge and a trailing edge; and (c) a plurality of wedges extending radially outward from each of the plurality of mixer vanes, at least one of the plurality of wedges on each of the plurality of mixer vanes including serrations providing a serrated edge extending perpendicular to the air flow, wherein the air flow is configured to enter the main mixer at the leading edge of each of the plurality of mixer vanes, flow over the plurality of wedges on each of the plurality of mixer vanes, and exit the mixer vanes at the trailing edge of each of the plurality of mixer vanes, and wherein the air flow and the fuel flow are configured to be mixed to form a fuel-air flow, wherein the plurality of wedges are configured to create vortices in the air flow to provide a uniform fuel-air flow, and wherein the serrations are configured to break down the vortices into smaller vortices.

13. The gas turbine combustor of claim 12, wherein the plurality of wedges extends radially from a surface of each of the plurality of mixer vanes.

14. The gas turbine combustor of claim 12, wherein the plurality of wedges extending radially outward from each of the plurality of mixer vanes include a first wedge, a second wedge, and a third wedge, and wherein the first wedge and the second wedge are each plain wedges with no serrations and the third wedge includes the serrations.

15. The gas turbine combustor of claim 12, wherein the plurality of wedges on each of the plurality of mixer vanes includes a first wedge and a second wedge, each of the first wedge and the second wedge including the serrations.

16. The gas turbine combustor of claim 12, wherein the plurality of wedges on each of the plurality of mixer vanes includes a first wedge, a second wedge, and a third wedge, wherein the first wedge and the third wedge include the serrations, and wherein the second wedge is a plain wedge with no serrations.

17. The gas turbine combustor of claim 12, each of the mixer vanes comprising a radially outward facing surface and a radially inward facing surface, at least one mixer vane further comprising one or more shaped holes located on the radially outward facing surface between adjacent wedges of the plurality of wedges, the one or more shaped holes configured to allow the air flow to flow or to wash to the radially inward facing surface of the at least one mixer vane.

18. The gas turbine combustor of claim 12, wherein the serrations, in shape, are square, triangle, wavy, U-shape, inverted U-shape, sine wave, cosine wave, or any combination thereof.

19. The gas turbine combustor of claim 12, wherein the plurality of wedges extend radially away from a center of the main mixer on a radially outward facing surface of each of the plurality of mixer vanes.

20. The gas turbine combustor of claim 12, wherein the plurality of wedges extend radially toward a center of the main mixer on a radially inward facing surface of each of the plurality of mixer vanes.

* * * * *